Sept. 25, 1934.   B. T. LAFLIN   1,974,572
ROTARY PICKING STAND
Filed Oct. 3, 1932   3 Sheets-Sheet 1
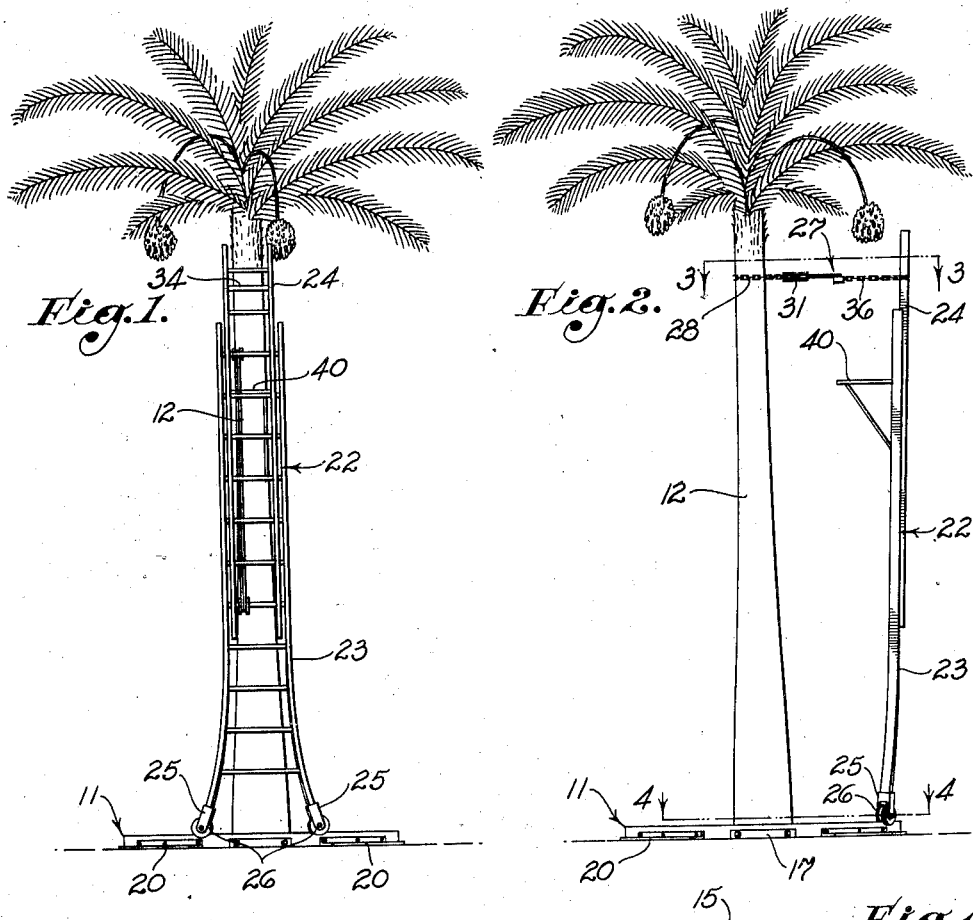
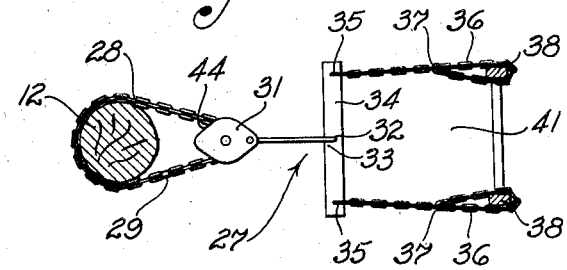
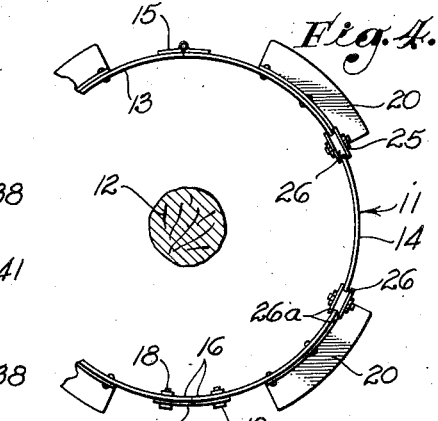
INVENTOR:
Benjamin T. Laflin,
BY
ATTORNEY.

Sept. 25, 1934.      B. T. LAFLIN      1,974,572
ROTARY PICKING STAND
Filed Oct. 3, 1932      3 Sheets-Sheet 2
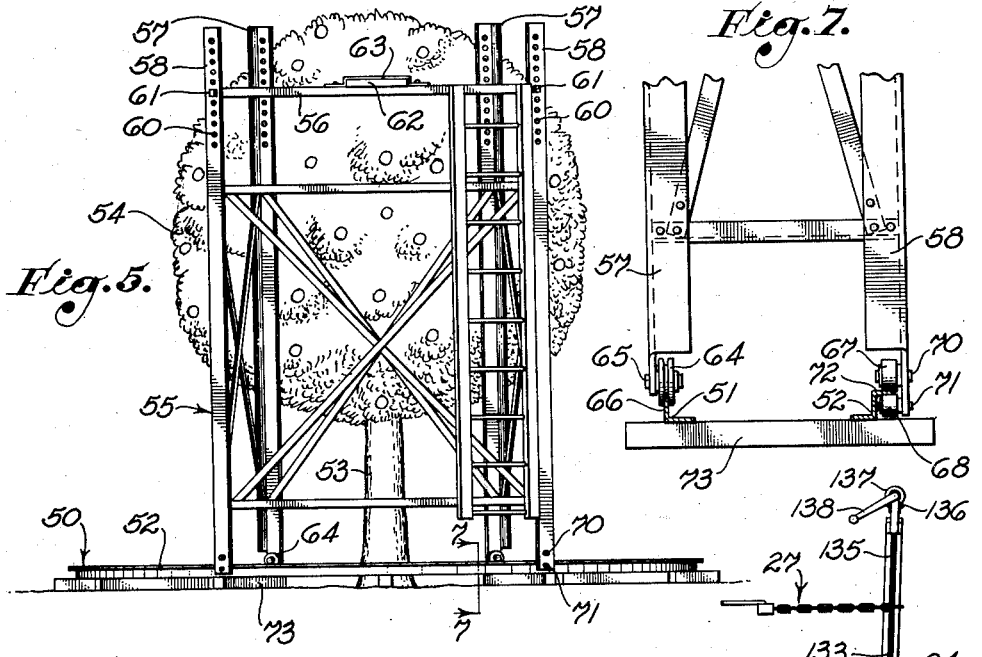
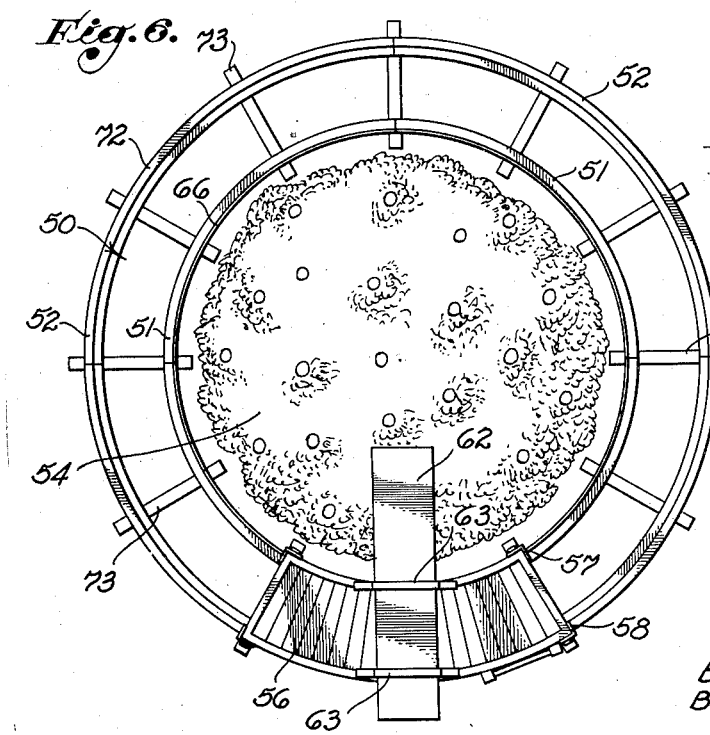
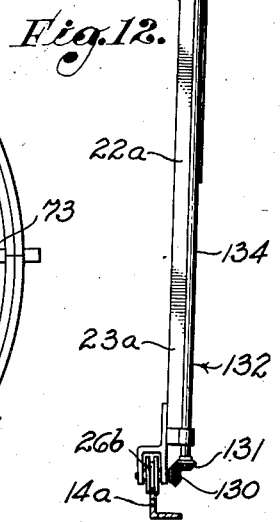
INVENTOR:
Benjamin T. Laflin,
BY
ATTORNEY.

Sept. 25, 1934.  B. T. LAFLIN  1,974,572
ROTARY PICKING STAND
Filed Oct. 3, 1932   3 Sheets-Sheet 3
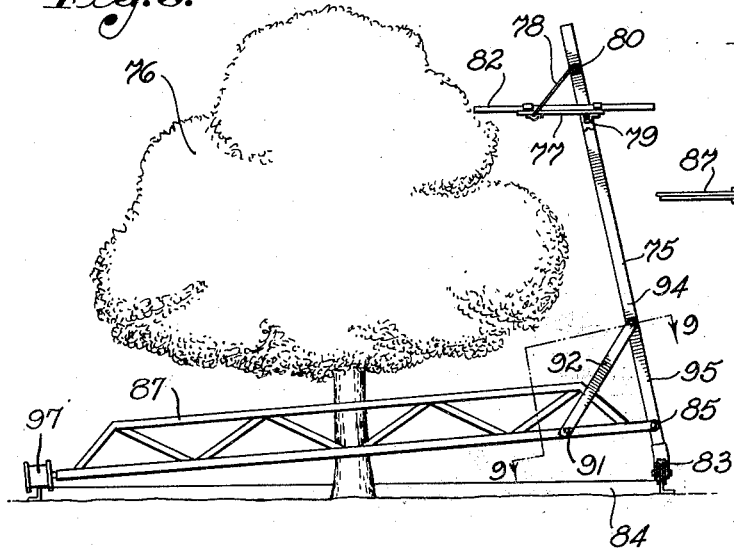
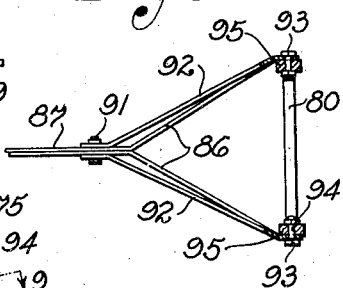
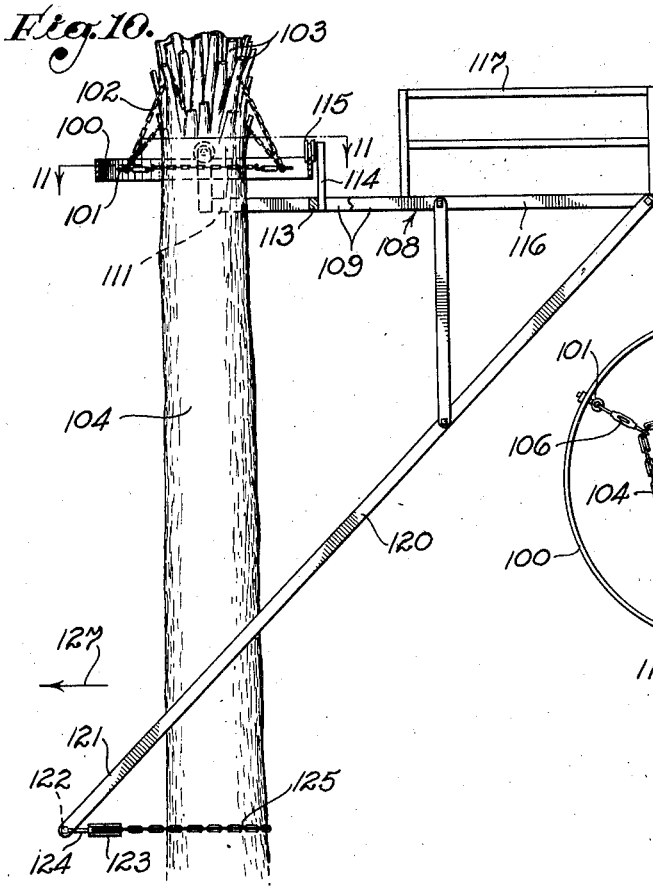
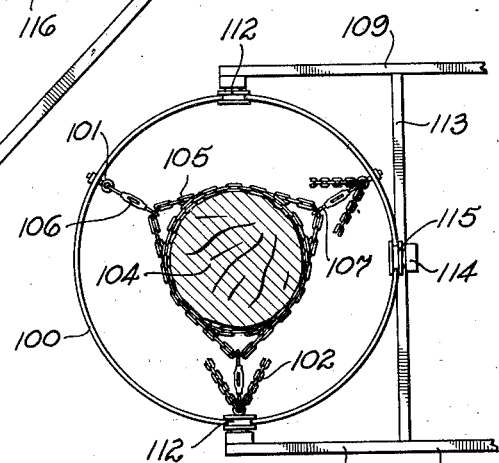
INVENTOR:
Benjamin T. Laflin,
By
ATTORNEY.

Patented Sept. 25, 1934

1,974,572

UNITED STATES PATENT OFFICE 1,974,572

ROTARY PICKING STAND

Benjamin T. Laflin, Thermal, Calif.

Application October 3, 1932, Serial No. 636,037

19 Claims. (Cl. 304—9)

My invention relates to an improvement in stands or supports for use in picking fruits from trees.

For picking fruits ladders are extensively employed which are moved from place to place as the picking progresses, the movement thereof requiring that the picker dismount. My present invention comprehends a simple stand or supporting structure for use by a picker, which may be moved from place to place during the picking operation without it being necessary for the picker or pickers to dismount therefrom, and being movable from place to place by the pickers themselves.

In its preferred form my invention embodies a track means adapted to encircle an area in which the tree is located, such track means generally being placed substantially concentric with the trunk of the tree. This, however, is not of prime importance in the use of the invention.

A further object of the invention is to provide a picking stand of the above character which may be readily adjusted in accordance with the height of the tree and which has an inwardly extending platform which may be extended inwardly over the top of the tree or within the upper portion of the tree so that fruits which are ordinarily hard to reach may be quickly picked.

My invention is inclusive of one embodiment particularly suited for picking fruits from tall trees such as date palms, which embodiment of the invention may be economically manufactured and which is of such simple character that it may be easily handled by a single picker. This form of the invention comprises a circular track adapted to be placed on the ground around the base of the tree, and a stand in the form of a ladder, with means for movably connecting the upper portion of the ladder to the upper part of the tree, with the upper portion of the ladder in an outwardly sloping position relative to the tree.

At the present time, for young or short trees ordinary stepladders are employed which are moved from place to place, and for a taller tree an extensible ladder is placed in a position leaning against the tree with the upper end of the ladder in engagement with the tree trunk. The bunches of fruit hang at some distance from the trunk of the tree and are hard to reach from the upper ends of the ladders employed. My invention provides a means for supporting a ladder in a position leaning from the tree so that the upper end of the ladder is further away from the tree trunk than the lower end and is in a position from which the fruit may be easily reached. The ladder saves a great deal of time in the picking of fruit for the reason that the picker does not need to dismount in order to change the position of the ladder and therefore may go around the entire tree.

The invention is not only of value in the picking of fruit but also for other operations which must be performed, such as trimming and fertilizing the buds.

It is a further object of the invention to provide a picking stand of the above character adapted to travel on a track, having means for preventing the overturning of the picking stand due to the eccentric application of weight thereto.

Further objects and advantages of the invention will be set forth in the following part of the specification.

Referring to the drawings, which are for illustrative purposes only,

Fig. 1 is a front elevation showing the embodiment of my invention especially adapted for use with trees of the character of date palms.

Fig. 2 is a side elevation corresponding to Fig. 1.

Fig. 3 is a cross section to enlarged scale on a plane represented by the line 3—3 of Fig. 2.

Fig. 4 is an enlarged cross section on the line 4—4 of Fig. 2.

Fig. 5 is a front elevational view of a second form of my invention adapted for use with relatively low trees of the spreading variety, such as citrus trees.

Fig. 6 is a plan view corresponding to Fig. 5.

Fig. 7 is an enlarged fragmentary cross section on the line 7—7 of Fig. 5.

Fig. 8 is an elevational view of a simplified form of the invention shown in Fig. 5, in which a single track is employed and the picking stand consists of a ladder.

Fig. 9 is a fragmentary sectional view taken as indicated by the line 9—9 of Fig. 8.

Fig. 10 is an elevational view showing a revolvable picking stand adapted for use on extremely tall trees.

Fig. 11 is a fragmentary cross section on a plane represented by the line 11—11 of Fig. 10.

Fig. 12 is a side elevation of a ladder equipped with means for driving the wheels thereof so as to move the ladder along the supporting track.

The form of my invention shown in Figs. 1 to 4 comprises a track means 11 which is preferably of fully circular form and is adapted to rest on the ground around the base of a tree 12. As shown in Fig. 4, the track 11 may consist of a pair of semi-circular bars 13 and 14 swingably secured together by means of a hinge 15 on one side of the track 11 and having the ends 16 thereof detachably held by use of a plate 17 and screws or bolts 18. On the curved bars 13 and 14 plates or feet 20 may be secured in position to engage the ground.

An adjustable support 22 is provided which may be readily made from a standard extension ladder having a lower portion 23 with an upper portion 24 adjustably mounted thereon. By means of forked brackets 25, wheel means 26 are secured to the lower end 23 of the ladder member in position to roll on the curved track 11, these wheel means having peripheral grooves formed between flanges 26a, in the manner of sheaves, so that such wheel means will not slide from engagement with the track 11. This form of the invention provides means 27 for preventing the support 22 from overturning or falling, such means connecting the upper end portion of the support 22 to the upper portion of the tree. The means 27 includes a flexible member 28 forming a loop around the upper part of the trunk of the tree 12, this member being preferably a chain having a snap link 29 therein for permitting the loop formed by the chain 28 to be opened and removed from around the trunk of the tree. Engaging the flexible member 28 is a pulley means 31 which connects at 32 to the central portion 33 of a cross bar 34. The ends of the cross bar 34 carry metal links 35 to which chains 36 are secured. The outer ends of the chains 36 have securing means thereon, such as hooks 37, and are adapted to be carried around upright members 38 which form ladder legs of the adjustable support 22, and then hooked onto intermediate portions of the chains 36 in the manner shown in Fig. 3 to form loops of adjustable size. The means 27, as best shown in Fig. 2, supports the upper end of the ladder or supporting member 22 in such a manner that the upper end of the member 22 slopes outwardly relative to the trunk of the tree 12 and constantly tends to swing away from the tree, which outward swinging movement thereof is limited by the means 27. On the support 22 an auxiliary supporting means, such as a platform 40, may be adustably secured in the manner shown in Fig. 2, on which the fruit picker may stand with his body extending through the space 41 included between the chains 36. This picking stand may be readily moved from one position to another around the tree 12 by a pulling force exerted by the picker who is standing on the platform 40. As the roller means 26 move along the circular path defined by the track 11, the pulley means 31 rolls on the loop formed by the flexible member 28, the apex 44 of the loop changing with the sliding movement of the flexible member 28 on the trunk of the tree. Any weight added to the supporting means 22 merely increases the outwardly directed pull against the means 27. The slope of the means 22 may be readily changed by increasing the effective lengths of the members 36, which may be accomplished by moving the hooks 37 from one position to another.

In the form of my invention shown in Figs. 5, 6, and 7, I provide a track 50 consisting of inner and outer parallel rail members 51 and 52, the track 50 being preferably fully circular so as to be placed in a position surrounding the trunk 53 of a tree 54. Movable on this track is a supporting structure 55 having a vertically adjustable portion 56 which may be in the form of a horizontal table adjustably carried by vertical corner posts or angles 57 and 58 of the structure 55. Any suitable means are provided for raising and lowering the table 56 and for holding the same in a desired position of utility, but for this purpose I simply show holes 60 in the members 57 and 58 through which bolts 61 may be selectively extended. The table 56 carries an auxiliary supporting means or platform 62 which may consist of a plank extending through flat loops 63 mounted on the table 56. The platform 62 may be moved inwardly and outwardly through the loops 63 as desired so as to extend over the upper portion of the tree or in between the upper branches of the tree to give access to fruit which is hard to reach by the use of ordinary ladders. As best shown in Fig. 7, the lower end of each post or leg 57 has a sheave-like roller 64 rotatably mounted on a horizontal stud 65 in position to engage the inner track member 51 which may consist of a structural angle placed with a leg 66 thereof extending upwardly into engagement with the groove of the roller member 64. At the lower end of each post or leg 58, upper and lower rollers 67 and 68 are mounted on studs 70 and 71 in positions to straddle a horizontal, outwardly extending web 72 provided by the outer rail 52 of the track 50. This outer rail 52 may be readily made from standard Z-bar structural steel, and the rail members 51 and 52 may be secured to radially extending tie members 73.

It is to be understood that the track 50, if it is made fully circular in form, may consist of sections detachably secured together. This form of the invention has means for preventing overturning of the picking stand. The weight of a picker on the inwardly extending portion of the platform 62, being eccentric to the supporting structure 55, tends to cause the picking stand to topple inwardly toward the tree 54, which is prevented owing to the fact that the rollers 68 engage the under face of the web 72 of the outer rail 52.

In the form of the invention shown in Figs. 8 and 9, I provide an inwardly sloping ladder 75, which ladder is eccentrically loaded, the ladder 75 being adapted for use with a tree 76 of the low, spreading variety carrying fruit on the upper branches thereof which is not easily reached from the ordinary picking ladders. This ladder 75 has a platform member 77 provided with means 78 and 79 for engaging selected rungs 80 of the ladder and having an extension member 82 slidably mounted thereon similar in character to the extensible member 62 of Fig. 5. The lower end of the ladder is provided with grooved rollers 83 adapted to engage a circular track 84 which is placed around the base of the tree. From pivot members 85 mounted near the lower end of the ladder 75, bars 86 are extended inwardly and are converged and secured together to form an arm or a fabricated structure 87. From pivot means such as a bolt 91 carried by the arm 87, diagonal struts 92 are extended to adjustable members such as bolts 93 adapted to engage openings 94 in the upright members 95 of the ladder 75. The slope of the ladder 75 may be varied to suit the working conditions by changing the positions of the pivot members 93, which is accomplished by moving them into selected holes 94. It is understood, of course, that the circular track 84 is separable at one or more points so that it may be readily placed around the tree 76.

The supporting arm 87 may extend substantially diagonally across the circular track 84 and be provided with means engaging the track such as a roller 97 bearing on the track at a point remote from the wheels or grooved rollers 83. The arm structure 87 may be centrally bowed so as to clear the trunk of the tree 76. By use of an arm of this character the entire load of the ladder is carried on the track 84, and by the use of the roller 97, the arm structure 87 and the elements connecting the arm structure to the ladder 75, the ladder is prevented from overturning due to the eccentric loading thereof.

In Figs. 10 and 11 I show my invention adapted for use with extremely tall trees such as tall date palms. In this form of the invention the track is mounted near the upper end of the tree trunk instead of on the ground at the base of the tree, and may consist of a circular track member 100 having a number of eye bolts 101 extending inwardly from the lower edge thereof, three eye bolts being suitable in the ordinary practice of the invention. From these eye bolts hanger chains 102 are extended diagonally inwardly and upwardly so as to pass over projecting members of the tree, such as fronds 103. The weight applied to the track 101 is carried by the chains 102, and the track is centralized relative to the trunk 104 of the tree by means of chain loops 105, three in number, which are respectively connected to the eye bolts 101 by the use of tightening means such as turnbuckles 106 having hooks 107 at the ends thereof for engaging the chain loops 105. In this form of the invention the picking stand includes a horizontal frame 108 having side bars 109 which are spaced apart laterally at such distance that the inner ends 111 thereof may support grooved wheels or rollers 112 in engagement with the track 100 in diametrally opposing positions. A cross bar 113, connecting the side bars 109 at an intermediate point, is provided with an upwardly extending plate 114 carrying a grooved roller 115 at the upper end thereof to engage the track 100 at a point intermediate the rollers 112. The outer portion 116 of the frame 108 may be floored and equipped with a guard rail 117 to form a protective platform on which the picker may operate. Extending downwardly and inwardly from the outer end of the frame 108 are two diagonal struts 120 which pass on opposite sides of the trunk 104 and between the lower ends 121 thereof detachably support a cross bar 122 to which a pulley 123 is connected by means of a link 124. The pulley 123 engages a chain loop 125 which surrounds the lower portion of the trunk 104, this chain loop being of the character of the chain loop 28 shown in Fig. 3 and restraining the struts 120 from movement in the direction of the arrow 127 so that the outer end of the frame 108 will not swing downwardly. The picking stand consisting essentially of the frame 108 may be moved from tree to tree as desired, but the track 100 and the supporting chains therefor remain permanently in place, it being necessary to readjust the position of the track 100 in accordance with the growth of the tree.

When the form of my invention shown in Figs. 1 and 2 is employed for extremely tall trees, it may be advisable to provide positive means for moving the lower end of the ladder 22 on the track 11 so as to avoid the possibility of the ladder tipping sideways when forces are applied to the upper end thereof to move the ladder to a consecutive position.

In Fig. 12 I show a ladder 22a which may be of adjustable character and consist of lower and upper ladder portions 23a and 24a, the lower end of the portion 23a being provided with rollers such as the roller 26b adapted to engage a track 14a. One of the rollers, for instance the roller 26b, has a bevel gear 130 connected to the shaft thereof so as to be driven by a bevel gear 131 secured to the lower end of a vertical shaft member 132 which may consist of an upper tube 133 and a lower tube 134 in telescoping engagement so that the shaft member 132 may vary in length in accordance with the extension or length of the ladder 22a. The upper end 135 of the shaft member 132 is provided with a manually operable driving means which may consist of a bevel gear 136 mounted on the upper end of the member 133 and a bevel gear 137 in position to engage the bevel gear 136 and being equipped with a handle 138 which may be manually rotated by a person at the top of the ladder. Accordingly, by turning the handle 138 the roller 26b may be driven so as to cause the lower end of the ladder to move along the circular track 14a, thereby causing the picking stand or ladder to move around the trunk of the tree to a new position of operation.

Although I have herein shown my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A device of the character described, including: a curved track adapted to be placed in a position following the periphery of an area concentric with a tree; and a picking stand movable along said track, said stand having a support thereon for a picker.

2. A device of the character described, including: a curved track adapted to be placed in a position following the periphery of an area concentric with a tree; and a picking stand movable along said track, said picking stand including an adjustable support for a picker.

3. A device of the character described, including: a circular track adapted to be placed around a tree; and a picking stand movable along said track, said stand having a support thereon for a picker.

4. A device of the character described, including: a circular track adapted to be placed around a tree; and a picking stand movable along said track, said picking stand including an adjustable support for a picker.

5. A device of the character described, including: a curved track adapted to be placed in a position following the periphery of an area concentric with a tree; and a picking stand movable along said track, said stand having a support thereon for a picker, there being means for preventing said picking stand from overturning due to the eccentric loading thereof.

6. A device of the character described, including: a circular track adapted to be placed around a tree; and a picking stand movable along said track, said picking stand including an adjustable support for a picker, there being means for preventing said picking stand from overturning due to the eccentric loading thereof.

7. A device of the character described, including: a curved track adapted to be placed in a position following the periphery of an area concentric with a tree; and a picking stand movable along said track, said stand having a support thereon for a picker, there being means engaging said tree for preventing said picking stand from overturning due to the eccentric loading thereof.

8. A device of the character described, including: a curved track adapted to be placed in a position following the periphery of an area concentric with a tree; and a picking stand movable along said track, said stand having a support thereon for a picker, there being means engaging said track for preventing said picking stand from overturning due to the eccentric loading thereof.

9. A device of the character described, including: a circular track adapted to encircle the lower portion of a tree; a ladder having means at its lower end for engaging said track; and means for movably connecting the upper portion of said ladder to said tree.

10. A device of the character described, including: a circular track adapted to encircle the lower portion of a tree; a ladder having means at its lower end for engaging said track; and movable means connecting the upper end of said ladder to said tree in an outwardly sloping position.

11. A device of the character described, including: a circular track adapted to encircle the lower portion of a tree; a ladder having means at its lower end for engaging said track; a flexible member forming a loop around the upper part of said tree; pulley means to travel on said loop; and means connecting said pulley means to the upper part of said ladder.

12. A device of the character described, including: a circular track adapted to encircle the lower portion of a tree; a ladder having roller means at its lower end for engaging said track; a flexible member forming a loop around the upper part of said tree; pulley means to travel on said loop; a cross bar having an intermediate portion thereof connected to said pulley means; and adjustable members connecting the end portions of said cross bar to the upper part of said ladder.

13. A picking stand of the character described, including: an upright member having means near the upper end thereof on which a person may stand; and means for connecting the upper portion of said upright member to a tree in a position sloping upwardly and outwardly relative to the tree.

14. A device of the character described, including: a circular track adapted to be placed around the base of a tree; an upright member having roller means at its lower end for engaging said track; and means for connecting the upper end of said upright member to the tree in such position that said upright member will slope upwardly and outwardly relative to said tree.

15. A device of the character described, including: a circular track adapted to be placed around the base of a tree; an upright member having roller means at its lower end for engaging said track; means for connecting the upper end of said upright member to the tree in such position that said upright member will slope upwardly and outwardly relative to said tree; and means operable from the upper portion of said upright member to apply a force at the lower end of said upright member to move the same on said track.

16. A device of the character described, including: a curved track adapted to be placed in a position following the periphery of an area concentric with a tree; a picking stand movable along said track, said stand having a support thereon for a picker; and means operable from the upper portion of said picking stand to produce a force at the lower end of said picking stand to move the same along said track.

17. A picking stand of the character described, including: a circular track member adapted to be placed around the base of a tree; an upright member having roller means at its lower end for engaging said track member, said upright member sloping inwardly toward said tree; and an inwardly extending arm secured to the lower portion of said upright member for resisting the force acting in said upright member to cause the same to swing inwardly toward said tree.

18. A picking device of the character described, including: a circular track; means for securing said track around the upper portion of a tree trunk; a platform member hung from said circular track in position extending outwardly from the tree trunk; and means engaging said tree trunk for preventing a downward swinging movement of the outer portion of said platform member.

19. A picking device of the character described, including: a circular track; means for securing said track around the upper portion of a tree trunk; and a carriage member supported on said track so as to move around said tree trunk.

BENJAMIN T. LAFLIN.